United States Patent Office 3,033,420
Patented May 8, 1962

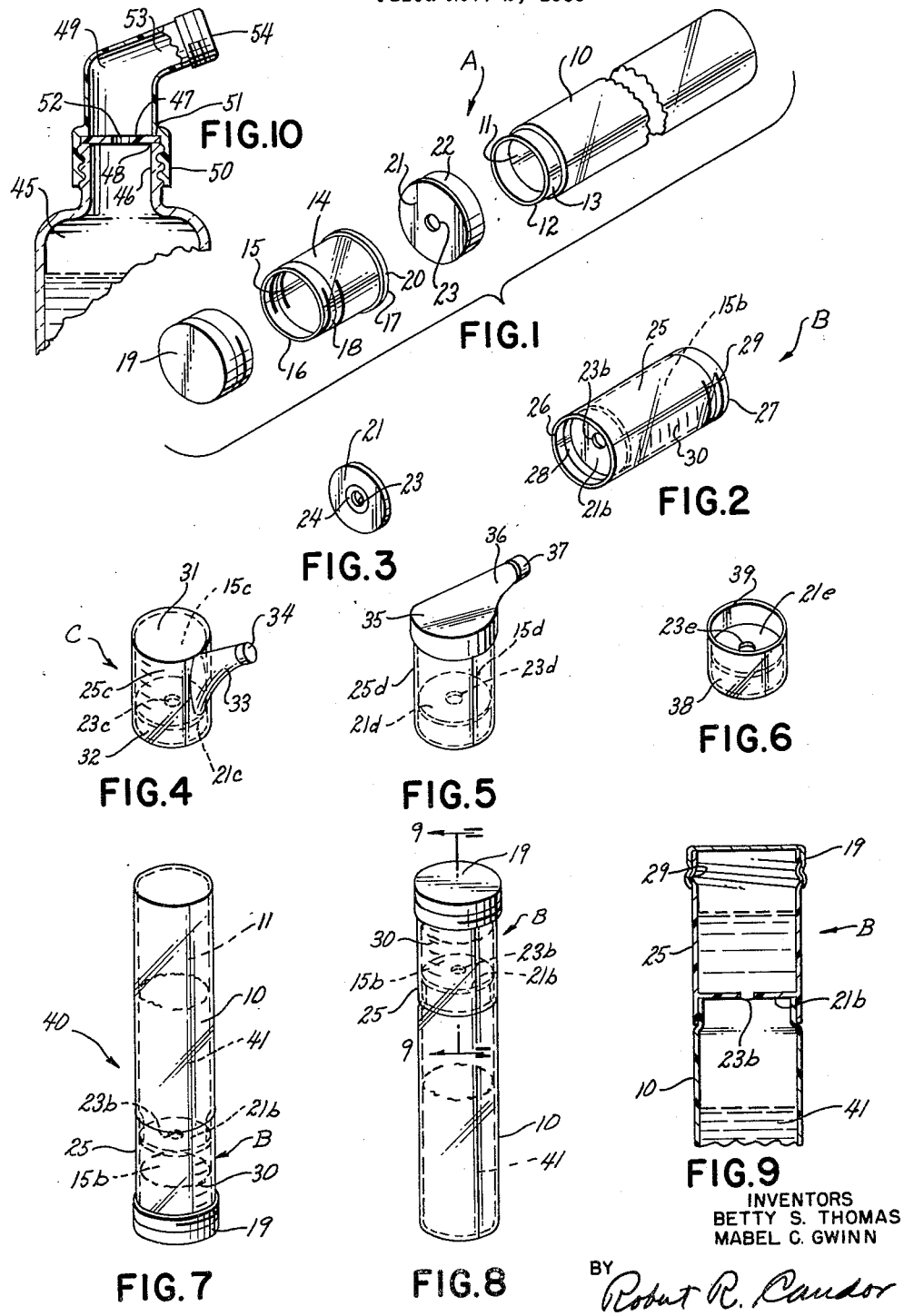

3,033,420
METHOD AND APPARATUS FOR DISPENSING LIQUIDS
Betty S. Thomas, 4317 Crestwood Ave., Dayton 31, Ohio, and Mabel C. Gwinn, 2424 Aragon Ave. E., Dayton 20, Ohio
Filed Nov. 2, 1959, Ser. No. 850,333
2 Claims. (Cl. 222—1)

This invention relates to an improved method and an improved container for dispensing predetermined quantities of liquids. This invention also relates to the method of making such an improved container or the like.

Generally, the methods and apparatus of this invention comprise a container having a liquid containing reservoir chamber and a measuring chamber. A wall or divider is carried by the container and separates the chambers. An opening is formed in the divider which interconnects the chambers. However, the opening and divider are so constructed and arranged that a predetermined amount of liquid from the reservoir chamber is adapted to be forced through the opening into the measuring chamber, such as by elevating the reservoir chamber above the measuring chamber and shaking the container. Subsequently, when the container is inverted to its normal position with the measuring chamber disposed above the reservoir chamber, the opening and divider prevent the liquid now contained in the measuring chamber from passing through the opening into the reservoir chamber when the liquid in the measuring chamber is in a static condition. In this manner, a predetermined amount of liquid can be subsequently dispensed from the measuring chamber.

Accordingly, it is an object of this invention to provide an improved container for dispensing predetermined amounts of a liquid.

It is another object of this invention to provide an improved method for dispensing predetermined amounts of a liquid.

Another object of this invention is to provide a method for making such an improved container or the like.

Other objects, uses and advantages of this invention are apparent upon a reading of this description taken in conjunction with the accompanying drawings forming a part thereof and wherein:

FIGURE 1 is an exploded perspective view illustrating a container of this invention in a slightly inverted position;

FIGURE 2 is a perspective view illustrating another embodiment of the measuring section of the container;

FIGURE 3 is a perspective view illustrating another embodiment of the divider of this invention;

FIGURES 4 and 5 are perspective views respectively illustrating other embodiments of the measuring section of the container;

FIGURE 6 is a perspective view illustrating another embodiment of the divider of this invention;

FIGURES 7 and 8 are perspective views illustrating the method of this invention; and FIGURE 9 is a fragmentary cross-sectional view of the container illustrated in FIGURE 8 and is taken on line 9—9 thereof.

FIGURE 10 is a fragmentary cross-sectional view of another embodiment of this invention.

Reference is now made to the accompanying drawings wherein like reference numerals and letters are used throughout the various figures thereof to designate like parts where appropriate, and particular reference is made to FIGURE 1 illustrating an improved container of this invention and generally indicated by the reference letter A.

The container A comprises a body or container section 10 having a reservoir chamber 11 formed therein, the chamber 11 having an open end 12 defined by a reduced portion 13 of the body or section 10. The reservoir chamber 11 is adapted to receive a supply of a desired liquid for a purpose set forth hereinafter.

A measuring or second container section 14 has a measuring chamber 15 formed therein, the chamber 15 defining a pair of opposed open ends 16 and 17 of the section 14. The outer surface of the section 14 is externally threaded at 18 in the region of the open end 16 thereof in order to telescopically receive an internally threaded closure member 19.

The end 17 of the section 14 is enlarged at 20 in order to telescopically receive a divider 21, the section 14 and divider 20 being suitably secured together, such as by an adhesive or the like. A depending flange 22 extends from the outer perimeter of the divider 21 and is adapted to snapfit on the end 13 of the body 10 to close off the open end 12 thereof. In this manner the measuring section 14 is detachably secured to the reservoir section 10.

An opening 23 is formed through the divider or wall 21, the opening 23 interconnecting the chambers 15 and 11 when the sections 14 and 10 are assembled together.

Preferably the divider 21 is formed from a material that is substantially non-wettable by the liquid contained in the reservoir chamber 11 for a purpose more fully described hereinafter. For example, when the desired liquid is water or has properties similar to water, the divider 21 may be formed of polyethylene. However, it is believed not necessary to form the entire divider from a material that is substantially non-wettable by the desired liquid as the same may be made of any material and subsequently coated by a non-wettable material such as polyethylene, wax or the like. Further, if desired, the divider may only be coated or formed of a non-wettable material in the region of the opening 23 as shown at 24 in FIGURE 3.

If desired, the divider 21 and measuring section 14 may be formed integrally, such as by molding or the like. In particular, a measuring section B is illustrated in an upward direction in FIGURE 2 and comprises a hollow cylindrical body 25 having a pair of opposed open ends 26 and 27, the end 26 being internally threaded at 28 to cooperate with external threads on the attaching end of a reservoir section and the end 27 being externally threaded at 29 to cooperate with a closure means similar to closure means 19.

A divider or wall 21b is formed integrally with the cylindrical body 25 adjacent the end 26 thereof, the divider 21b cooperating with the body 25 to define a measuring chamber 15b.

Since it is desirable to form the measuring section 25 of a transparent or translucent material, such as polyethylene or the like, the section 25 may be suitably marked with a measuring scale 30, the scale running from the end 27 toward the divider 21b or from the divider 21b toward the end 27 as desired.

The measuring section may be formed in the manner illustrated in FIGURE 4. In particular, the measuring section C is formed in substantially the same manner as the section B previously described except that the upper end of the body 25c is closed by an integral end wall 31, the end wall 31, body 25c, and divider 21c defining the measuring chamber 15c. The end portion 32 of the body 25c that projects beyond the divider 21c may be formed to snap-fit on the end of the reservoir section or to threadedly engage the same as desired.

A spout 33 may be formed integrally with the body 25c or formed separately and suitably secured thereto, the spout 33 being interconnected to the lower end of the measuring chamber 15c and projecting angularly therefrom. The free end of the spout 33 is closed by a suitable threaded closure member 34. If desired, the diameter of the spout 33 may be materially larger than the opening 23c and/or may be wettable by the liquid. In this manner, any liquid in the measuring chamber 15c can be dispensed through the spout 33.

As illustrated in FIGURE 5, the measuring section D is formed in substantially the same manner as the measuring section B except that a closure member 35 is secured to the upper end of the body 25d by either a snap-fit connection or a threaded connection. The closure member 35 has a pour spout 36 projecting therefrom, the spout 36 being interconnected with the measuring chamber 15d and having a threaded closure 37 for closing the free end thereof. Likewise, the spout 36 may be larger than its partition opening 23d and/or may be wettable by the liquid.

While the various embodiments of this invention have been described with a measuring chamber having a fixed capacity, it is to be understood that the divider 21 may be formed separately to interconnect various measuring sections and reservoir sections together as desired. For example, a divider 21e is illustrated in FIGURE 6 and is provided with opposed flanges 38 and 39 extending outwardly from the outer perimeter of the divider 21e, the flanges 38 and 39 may be formed for snap-fit connection or threaded connection as desired. In this manner, the divider 21e may be interconnected to any desired reservoir section by the flange 38 and interconnected to any desired measuring section by the flange 39.

Further, the closure member of the measuring chamber may be adjusted to vary the capacity of the measuring chamber as desired by varying its telescoping relation on the open end of the measuring section.

The method of this invention will now be described. As illustrated in FIGURES 7, 8 and 9, a container 40 is provided with the reservoir section 10 and the measuring section B. The reservoir chamber 11 had been filled with a supply of a desired liquid 41 while the measuring chamber 15b is left empty. The container 40 is normally stored in its upright position, i.e., the measuring chamber 15b is normaly disposed over the reservoir chamber 11.

When it is desired to dispense a predetermined amount of the liquid 41 from the container 40, the container 40 is inverted to the position illustrated in FIGURE 7 and the liquid 41 is forced into the measuring chamber 15b through the opening 23b by shaking the container 40. When a predetermined amount of the liquid 41 has been forced into the chamber 15b as determined by the scale 30, the container is inverted to the upright position illustrated in FIGURES 8 and 9.

The liquid 41 now contained in the measuring chamber 15b does not flow back to the reservoir chamber 11 as it is believed that the surface tension of the same across the opening 23b prevents the liquid in the chamber 15b from passing through the opening 23b when the liquid in the measuring chamber 15b is in a static condition. The liquid in the measuring chamber can now be dispensed by removing the closure member 19.

When the measuring sections C and D are utilized, the liquid in the respective measuring sections can be dispensed through the pour spouts 33 and 36.

Various theories may be advanced as to why the liquid in the measuring chamber does not pass through the opening in the divider when the measuring chamber is elevated above the reservoir chamber. It is believed that because the divider in the region of the opening is substantially non-wettable by the particular liquid utilized, the molecules of the liquid in the region of the opening are not attracted by the divider and thus by surface tension support the liquid above the opening and prevent the same from entering the opening. Further, it is believed that the particular size of the opening in regard to the particular liquid utilized is a determining factor as well as the pressures of the air trapped in the respective chambers of the container.

In particular, it is believed that the size of the opening should be small enough to permit the surface tension of the liquid to support the height of the liquid column desired in the measuring chamber.

One example of a container that has operated successfully with a water-like liquid was formed in the manner set forth in FIGURE 1 wherein the reservoir section 10 is approximately 2 inches long, the reservoir chamber 11 has a diameter of approximately ⅞ inch, the diameter of the opening 23 in the divider 21 is approximately 3/16 inch, the measuring section 14 is approximately ⅝ inch long, and the diameter of the measuring chamber 15 is approximately ⅞ inch, the divider 21 being formed from a plastic material that is substantially non-wettable by water.

It can be seen that there is provided an improved container and method for dispensing predetermined amounts of a liquid. Such a container and method while having many applications is readily adaptable for dispensing liquid medicines in the amounts of so many teaspoons or tablespoons of medicine where the patient is bed-ridden and must take the medicine without assistance. The patient merely shakes the desired amount of liquid into the measuring chamber and then drinks the same from the measuring chamber either from the open end thereof or from the spout. In this manner, spoons are not necessary as the patient may not have a steady enough hand to administer the medicine by the spoon. Similarly, an adult may easily give medicine to a child with such a container without the usual danger of spillage.

While the embodiments, forms, and methods of the invention now preferred are disclosed herein in accordance with the requirements of the statute, other forms or methods may be used, all coming within the scope of the claims which follow this specification.

If desired, in FIGURE 5, for example, the removable closure member 35 may be made integral with the body 25d instead of being separable. The members 35 and 25d may then be aligned and without any offset in the side wall, as is obvious.

In all of the embodiments the joints between the parts which are shown as slip fit joints, may be made as threaded joints, and vice versa, if desired.

In FIGURE 10, the container section 45 may be a standard bottle of the type used in drug stores, and the like, to supply customers with various liquid medicines, and the like. For example, the bottle 45 may be a glass or plastic bottle of any desired size and shape, such as of circular or flat cross-section, and may be, for example of from 1 ounce, more or less, to 6 ounces, more or less in liquid capacity. The neck 46 may be threaded in the usual or standard manner to receive a standard internally threaded bottle stopper. However, according to this invention, instead of such standard bottle stopper, a disc 47 is placed on the upper edge 48 of neck 46. Such a disc 47 is chosen which is made of a material which is non-wettable by the liquid to be placed in the container 45. A measuring container section 49 has a threaded lower end 50 which threadedly engages the threaded neck 47. The shoulder 51 at the top of end 50 engages the outer edge of disc 47 and seals it between the shoulder 51 and the upper edge 48. The disc 47 has an opening 52 of the character and function heretofore described for the other openings, such as 23, etc. The section 49 has a pour spout 53 preferably of larger diameter than opening 52, and is sealed by the removable cap 54 which may have a sealing threaded engagement with the end of the pour spout 53. If desired the spout 53 may be chosen to be wettable or non-wettable by the liquid to be inserted in bottle 45 and of a transverse size to permit such liquid to flow freely out of the spout 53 when the cap 54 is removed after the shaking operation.

In use, the bottle 45 is inverted and shaken with the cap 54 in position to cause the desired measured quantity of liquid to pass through opening 52 and be retained in section 49. The bottle 45 is then turned up to place spout 53 on top and thereafter the cap 54 is removed. Then the measured liquid may be dispensed through spout 53 by properly tilting the bottle 45, as is obvious.

In this manner discs 46 and sections 49 of the required sizes and materials may be made and supplied with or without standard bottles, so such discs 47 and sections 49 may be used with various liquids and various standard bottles as desired.

However, the embodiment of FIGURE 10 may also be used with containers or bottles 45 which are of special design as well as those of standard design, as is obvious.

What is claimed is:

1. A method of dispensing a predetermined amount of a liquid from a container having a liquid containing reservoir chamber, a measuring chamber normally disposed above said liquid containing reservoir chamber, and a divider disposed between said chambers having an opening intercommunicating said chambers, said opening being of a size to prevent said liquid from passing from said measuring chamber to said reservoir chamber under static conditions, but to permit said liquid to pass from said reservoir chamber to said measuring chamber when said container is shaken, said measuring chamber having a dispensing outlet, said method comprising the steps of introducing said liquid into said reservoir chamber, inverting said container to dispose said liquid containing reservoir chamber above said measuring chamber, and shaking said inverted container so as to force a predetermined amount of liquid from said reservoir chamber through said opening into said measuring chamber, and, thereafter dispensing said predetermined amount of liquid from said measuring chamber to the exterior of said measuring chamber through said dispensing outlet.

2. A method according to claim 1 which includes the further steps of re-inverting the container to its normal position and, thereafter, canting the container so as to dispense said predetermined amount of liquid from said measuring chamber through said dispensing outlet.

References Cited in the file of this patent

UNITED STATES PATENTS

| | | |
|---|---|---|
| 1,736,440 | Hall | Nov. 19, 1929 |
| 1,984,651 | Meves | Dec. 18, 1934 |
| 2,361,818 | Brightwell | Oct. 31, 1944 |
| 2,423,173 | Brady et al. | July 1, 1947 |
| 2,761,833 | Ward | Sept. 4, 1956 |
| 2,773,521 | Perrson | Dec. 11, 1956 |
| 2,807,288 | Shea | Sept. 24, 1957 |